United States Patent
LaRoche et al.

(10) Patent No.: US 11,932,254 B1
(45) Date of Patent: Mar. 19, 2024

(54) POWERTRAIN TORQUE CONTROL DURING A TRANSMISSION SHIFT

(71) Applicant: FORD GLOBAL TECHNOLOGIES, LLC, Dearborn, MI (US)

(72) Inventors: Cory Benson LaRoche, Commerce Township, MI (US); Stephen Michael Cicala, Dearborn Heights, MI (US); Jianping Zhang, Ann Arbor, MI (US); Bradley Dean Riedle, Northville, MI (US); Jesse D. L. Brunais, Livonia, MI (US); Michael Simon, Plymouth, MI (US); Leonard Dziubinschi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/977,397

(22) Filed: Oct. 31, 2022

(51) Int. Cl.
*B60W 30/19* (2012.01)
*B60W 10/06* (2006.01)
*B60W 10/11* (2012.01)
*F02D 41/00* (2006.01)
*F02D 41/02* (2006.01)
(Continued)

(52) U.S. Cl.
CPC .......... *B60W 30/19* (2013.01); *B60W 10/06* (2013.01); *B60W 10/11* (2013.01); *F02D 41/0087* (2013.01); *F02D 41/022* (2013.01); *F02D 41/023* (2013.01); *F02P 5/1502* (2013.01); *F16H 59/18* (2013.01); *F16H 61/2807* (2013.01); *B60W 2510/1025* (2013.01); *B60W 2510/105* (2013.01); *B60W 2540/10* (2013.01); *B60W 2710/0666* (2013.01); *B60W 2710/1005* (2013.01); *B60W 2710/1077* (2013.01); *F16H 2059/148* (2013.01)

(58) Field of Classification Search
CPC .... B60W 30/19; B60W 30/106; B60W 10/11; B60W 2540/10; B60W 2710/0666; B60W 2510/1025; B60W 2510/1058; B60W 2710/1077; B60W 2710/1083; F16H 59/18; F02D 41/0087; F02D 41/022; F02D 41/023
USPC .................................................. 477/102, 109
See application file for complete search history.

(56) References Cited

U.S. PATENT DOCUMENTS

| | | |
|---|---|---|
| 5,129,286 A | 7/1992 | Nitz et al. |
| 6,434,466 B1 | 8/2002 | Robichaux et al. |

(Continued)

*Primary Examiner* — Roger L Pang
(74) *Attorney, Agent, or Firm* — Vincent Mastrogiacomo; Brooks Kushman P.C.

(57) ABSTRACT

A vehicle includes an engine, a transmission, and a controller. The engine is configured to generate power. The transmission is configured to transfer power from the engine to at least one drive wheel to propel the vehicle. The controller is programmed to, in response to a command to shift the transmission and a corresponding command to decrease a torque of the engine to less than a threshold corresponding to a spark retard limit during the shift, (i) increase the pressure of an oncoming clutch to engage the oncoming clutch, (ii) retard an engine spark at the spark retard limit to reduce the torque of the engine to the threshold during the engagement of the oncoming clutch, and (iii) shutdown at least one cylinder of the engine to further reduce the torque of the engine to less than the threshold during the engagement of the oncoming clutch.

14 Claims, 4 Drawing Sheets

(51) Int. Cl.
  *F02P 5/15*   (2006.01)
  *F16H 59/18*  (2006.01)
  *F16H 61/28*  (2006.01)
  *F16H 59/14*  (2006.01)

(56) References Cited

U.S. PATENT DOCUMENTS

| | | |
|---|---|---|
| 7,426,915 B2 | 9/2008 | Gibson et al. |
| 8,352,133 B2 | 1/2013 | Hopp |
| 8,473,172 B2 | 6/2013 | Gibson et al. |
| 8,721,498 B2 * | 5/2014 | Schang ............ B60W 30/1882 |
| | | 477/111 |
| 9,393,954 B2 | 7/2016 | Gibson et al. |
| 9,404,575 B2 | 8/2016 | Somerville et al. |
| 9,523,341 B2 * | 12/2016 | Doering ................ B60W 20/10 |
| 10,871,140 B1 * | 12/2020 | Christensen ............ F02P 5/045 |
| 10,967,847 B2 | 4/2021 | Seo et al. |
| 11,097,721 B1 | 8/2021 | Zhao et al. |
| 2011/0270509 A1 * | 11/2011 | Whitney ............. F02D 41/1497 |
| | | 123/406.12 |
| 2013/0296117 A1 | 11/2013 | Shelton et al. |
| 2015/0047607 A1 * | 2/2015 | Glugla ................. B60W 30/19 |
| | | 903/902 |
| 2018/0194355 A1 * | 7/2018 | Tsuda ................. B60W 30/188 |

* cited by examiner

POWERTRAIN TORQUE CONTROL DURING A TRANSMISSION SHIFT

TECHNICAL FIELD

The present disclosure relates to vehicles having powertrains that include engines and transmissions, and control systems for such powertrains.

BACKGROUND

Vehicles may include transmissions that are configured to deliver power from an engine to one or more drive wheels.

SUMMARY

A vehicle includes an engine, a transmission, an accelerator pedal, and a controller. The engine is configured to generate power. The transmission is configured to transfer power from the engine to at least one drive wheel to propel the vehicle. The transmission has a plurality of clutches configured to shift the transmission between a plurality of gear ratios. The accelerator pedal is configured to generate a command corresponding to a desired engine torque in response to depression of the accelerator pedal. The controller is programmed to, in response to a command to shift the transmission, (i) increase a pressure of an oncoming clutch to engage the oncoming clutch and (ii) reduce a torque of the engine from the desired engine torque to a reduced value. The controller is further programmed to, in response to the reduced value exceeding a threshold, retard an engine spark and maintain operation of all cylinders of the engine to reduce the torque of the engine during the engagement of the oncoming clutch. The controller is further programmed to, in response to the reduced value being less than the threshold, retard the engine spark and shutdown at least one cylinder of the engine to reduce the torque of the engine during the engagement of the oncoming clutch.

A vehicle includes an engine, a transmission, and a controller. The engine is configured to generate power. The transmission is configured to transfer power from the engine to at least one drive wheel to propel the vehicle. The controller is programmed to, in response to a command to shift the transmission and a corresponding command to decrease a torque of the engine to a first value that is greater than a threshold during the shift, (i) increase a pressure of an oncoming clutch of the transmission to engage the oncoming clutch and (ii) retard an engine spark and maintain operation of all cylinders of the engine to reduce the torque of the engine during the engagement of the oncoming clutch. The controller is further programmed to, in response to the command to shift the transmission and the corresponding command to decrease the torque of the engine to a second value that is less than the threshold during the shift, (i) increase the pressure of the oncoming clutch to engage the oncoming clutch and (ii) retard the engine spark and shutdown at least one cylinder of the engine to reduce the torque of the engine during the engagement of the oncoming clutch.

A vehicle includes an engine, a transmission, and a controller. The engine is configured to generate power. The transmission is configured to transfer power from the engine to at least one drive wheel to propel the vehicle. The controller is programmed to, in response to a command to shift the transmission and a corresponding command to decrease a torque of the engine to less than a threshold corresponding to a spark retard limit during the shift, (i) increase the pressure of an oncoming clutch to engage the oncoming clutch, (ii) retard an engine spark at the spark retard limit to reduce the torque of the engine to the threshold during the engagement of the oncoming clutch, and (iii) shutdown at least one cylinder of the engine to further reduce the torque of the engine to less than the threshold during the engagement of the oncoming clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
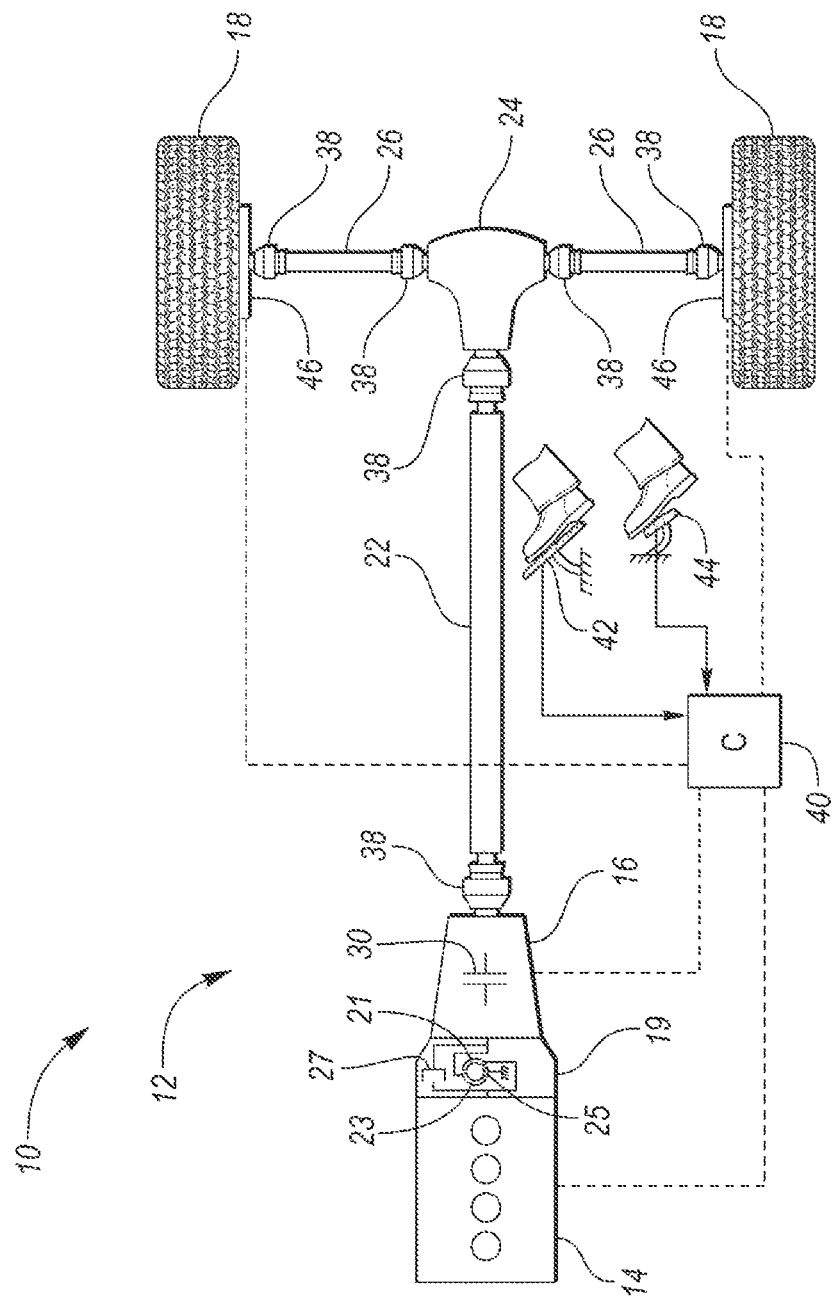
FIG. 1 is a schematic diagram representative of an exemplary vehicle and an exemplary vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The engine 14 is configured to generate power. The transmission 16 may be a multiple step-ratio automatic transmission. The powertrain 12 may utilize other power generating components (e.g., electric motors or fuel cells) in addition to the engine 14. The transmission 16 may be configured to provide multiple gear ratios between an input and an output of the transmission 16. The engine 14 is connected to the input of the transmission 16. The transmission 16 is configured to transfer power from the engine 14 to drive wheels 18 to propel the vehicle. More specifically, drivetrain components that are connected to an output of the transmission 16 are configured deliver power from the transmission 16 to the drive wheels 18.

The engine 14 may be connected to an input shaft of the transmission by a torque converter 19 or a launch clutch while an output shaft of the transmission 16 may be connected to a driveshaft 22. The driveshaft 22 may then be connected to a rear drive unit (RDU) 24. The RDU 24 may then be connected to the drive wheels 18 by half shafts 26. The RDU 24 may include a differential and/or one more clutches to control the power output to the wheels 18.

The torque converter 19 includes an impeller 21 fixed to the crankshaft of the engine 14, a turbine 23 fixed to an input shaft to the transmission 16, and a stator 25 that is grounded such that it does not rotate. The torque converter 19 thus provides a hydraulic coupling between the crankshaft of the engine 14 and the input shaft to the transmission 16. The torque converter 19 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 27 may also be provided that, when engaged, frictionally or mechanically couples the impeller and the turbine of the torque converter 19, permitting more efficient power transfer. The torque converter bypass clutch 27 may be configured to transition between an opened (or disconnected) state, a closed (or locked) state, and a slipping state. The rotation of the impeller 21 and the turbine 23 are synchronized when the torque converter bypass clutch 27 is in the closed or locked state. The rotation of the impeller 21 and the turbine 23 are non-synchronized when the torque converter bypass clutch 27 is in the opened state or the slipping state.

The transmission 16 may include gear sets (not shown) that are selectively placed in different gear ratios by selective engagement of friction elements such as clutches to establish the desired multiple discrete or step drive ratios. More specifically, the transmission 16 may have a plurality of clutches 30 configured to shift the transmission 16 between a plurality of gear ratios. The friction elements are controllable through a shift schedule that connects and disconnects certain elements of the gear sets to control the ratio between a transmission output shaft (e.g., driveshaft 22) and the transmission input shaft (e.g., a shaft connected to the crankshaft of the engine 14). The transmission 16 is automatically shifted from one ratio to another based on various vehicle and ambient operating conditions by an associated controller, such as a powertrain control unit (PCU). Power and torque from the engine 14 may be delivered to and received by transmission 16. The transmission 16 then provides powertrain output power and torque to driveshaft 22.

The various components of the powertrain 12, including the output shaft of the transmission 16, driveshaft 22, RDU 24, half shafts 26, wheels 18, may be connected to each other, as described above, via constant-velocity joints 38. Constant-velocity joints connect two rotating parts and allow the two rotating parts to rotate about different axes.

Although FIG. 1 depicts a rear-wheel drive vehicle, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. Constant-velocity joints may be disposed between any mating parts (e.g., between the half shaft and the wheels or between the half shaft and the transaxle).

The powertrain 12 further includes an associated controller 40 such as a powertrain control unit (PCU). While illustrated as one controller, the controller 40 may be part of a larger control system and may be controlled by various other controllers throughout the vehicle 10, such as a vehicle system controller (VS C). It should therefore be understood that the powertrain control unit and one or more other controllers can collectively be referred to as a "controller" that controls various actuators in response to signals from various sensors to control functions such as starting/stopping engine 14, select or schedule transmission shifts, etc. Controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 40 may communicate signals to and/or from engine 14, transmission gearbox 16, torque converter 19, etc. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery, clutch pressures for launch clutch and transmission clutch, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component presence, intake air flow (MAF), transmission gear, ratio, or mode, transmission oil temperature (TOT), transmission turbine speed (TS), torque converter bypass clutch 27 status (TCC), or shift mode (MDE) for example.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 42 is used by the driver of the vehicle to provide a desired or demanded torque, power, or drive command to propel the vehicle. In general, depressing and releasing the accelerator pedal 42 generates an accelerator pedal position signal that is representative of an accelerator pedal position and may be interpreted by the controller 40 as a demand for increased power or decreased power, respectively, or as a demand for increased torque or decreased torque, respectively. A brake pedal 44 is also used by the driver of the vehicle to provide a demanded braking torque to slow the vehicle. The brake pedal 44 may configured to actuate friction brakes 46 to slow the vehicle through a hydraulic, electrical, or other system when applied. In general, depressing and releasing the brake pedal 44 generates a brake pedal position signal that may be interpreted by the controller 40 as a demand to decrease the vehicle speed. Based upon inputs from the accelerator pedal 42 and brake pedal 44, the controller 40 commands the torque to the engine 14 and friction brakes 46. The controller 40 also controls the timing of gear shifts within the transmission 16 based on one or more shift schedules that may be stored as tables within the controller. The shift schedules may be based on a demanded torque or power output via the accelerator pedal and a speed of the vehicle.

It should be understood that the vehicle configuration described herein is merely exemplary and is not intended to be limited. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2:
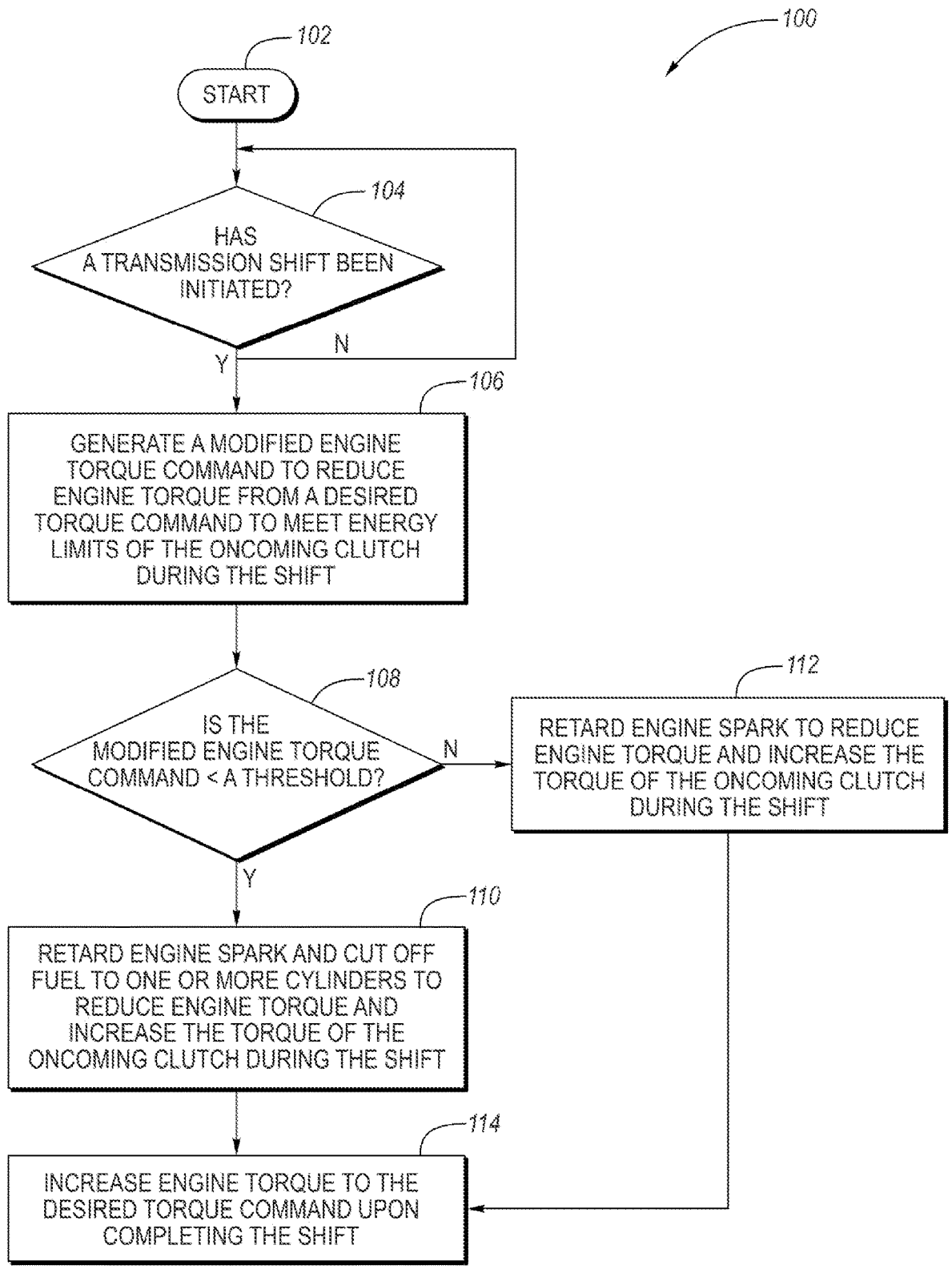
FIG. 2 is a flowchart illustrating a method for controlling the engine and an oncoming clutch during a shift in the transmission.
Figure 3:
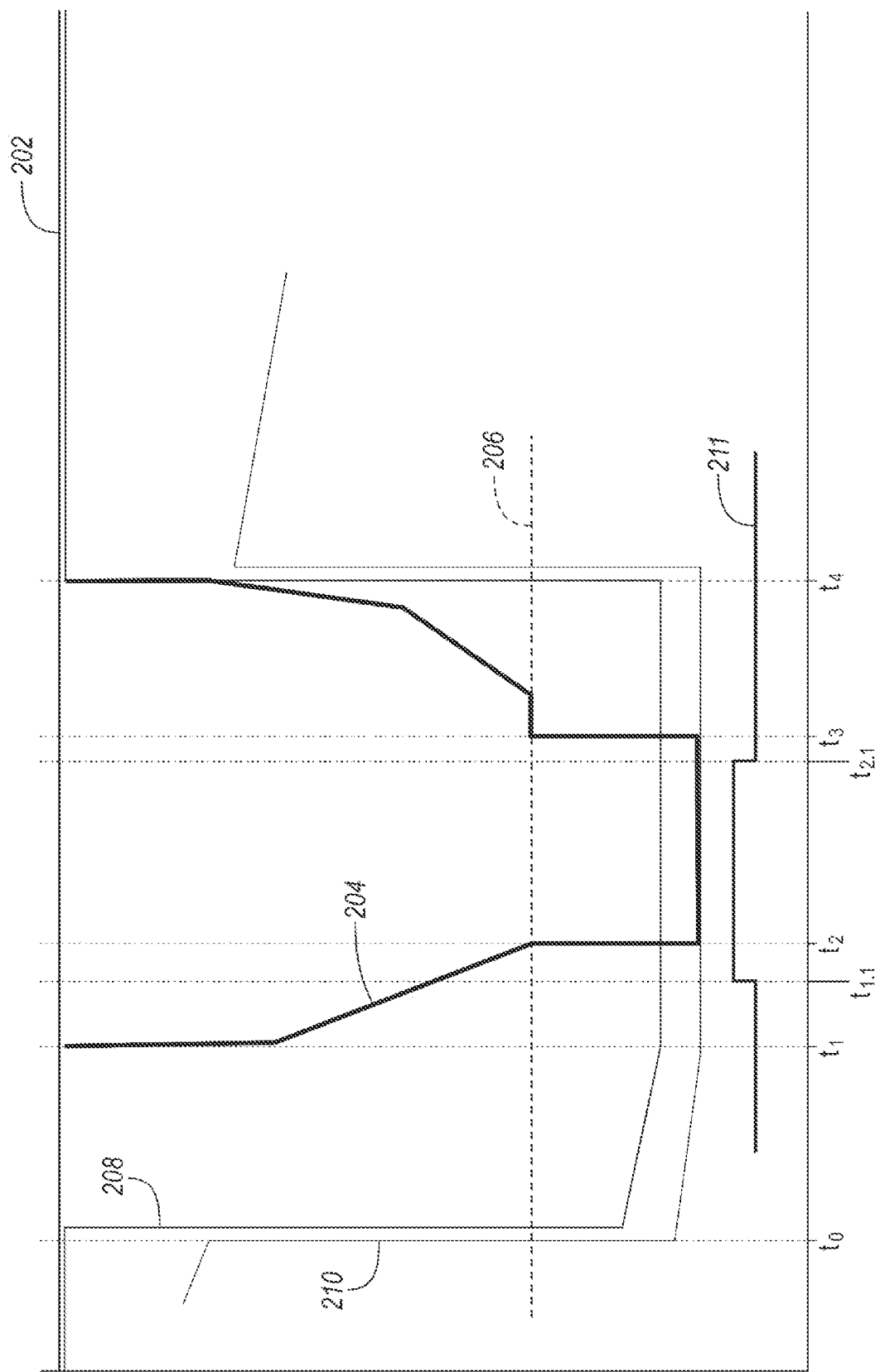
FIG. 3 is a series of graphs illustrating the engine torque modification during the shift in the transmission.
Figure 4:
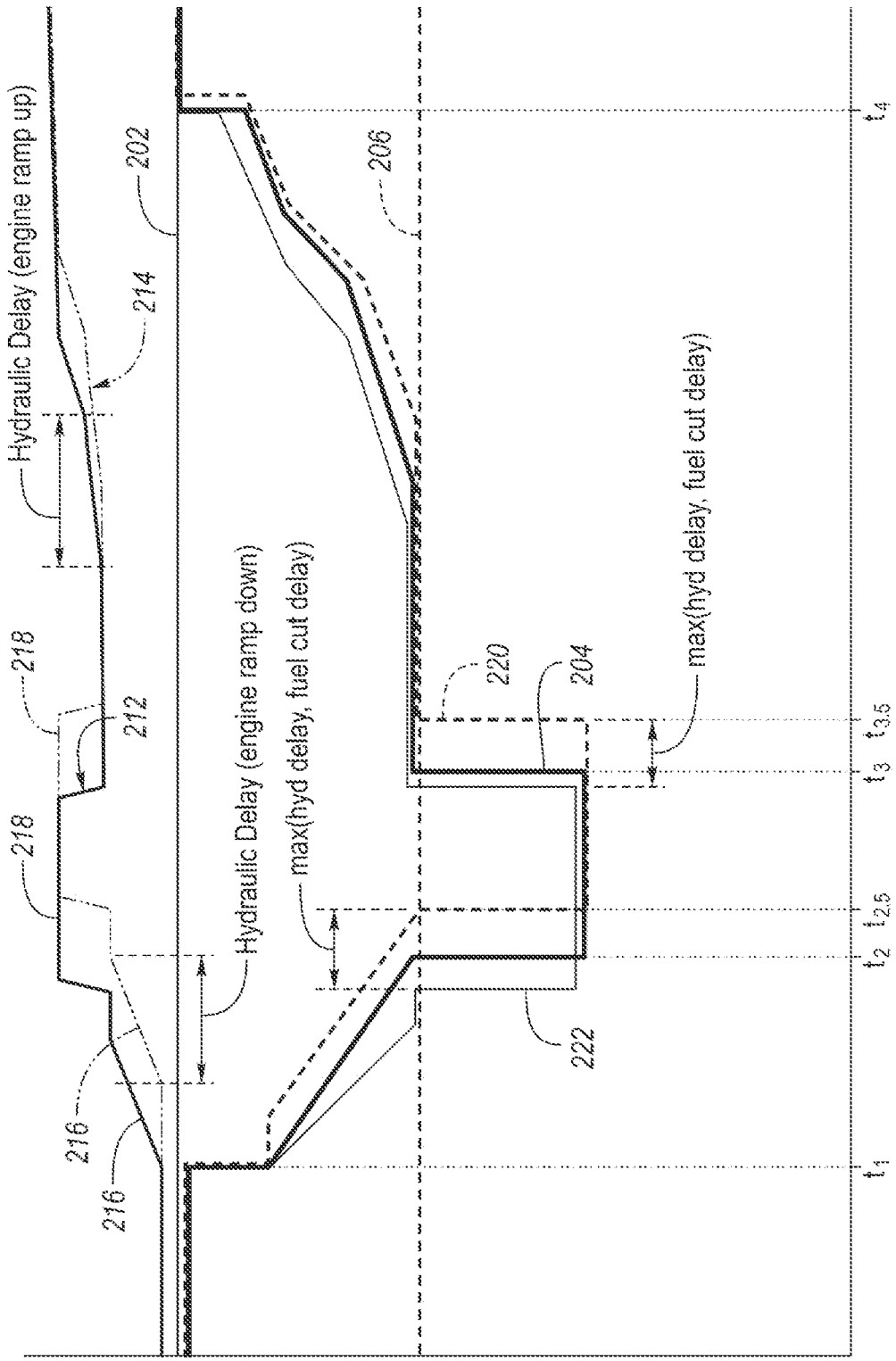
FIG. 4 is a series of graphs illustrating the coordination between the torque of the engine and the pressure of the oncoming clutch during the shift in the transmission.

Referring to FIGS. 2-4, (i) a flowchart of a method 100 for controlling the torque of the engine 14 and the torque of oncoming clutch (e.g., one of the plurality of clutches 30) during a shift in the transmission 16, (ii) a series of graphs illustrating the engine torque modification during the shift in the transmission 16, and (iii) a series of graphs illustrating the coordination between the torque of the engine and the pressure of the oncoming clutch during the shift in the transmission are illustrated, respectively. The method 100 and graphs of FIGS. 2-4 may be stored as control logic and/or an algorithm within the controller 40. The controller 40 may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle.

The method 100 next moves on to block 104 where it is determined if a shift in the transmission 16 has been initiated. If a shift has not been initiated, the method 100 returns to the beginning of block 104. If a shift has been initiated, the method 100 moves on to block 106 where a modified engine torque command is generated. The modified engine torque command is a reduced engine torque command relative to the desired torque command generated by depressing the accelerator pedal 42. The modified engine torque command is generated to meet the energy limits of the oncoming clutch during the shift of the transmission 16. Stated in other terms the torque of the engine 14 needs to be reduced during the shift so that it is within oncoming clutch's capacity and mechanical limits to receive energy from the engine 14. The desired torque command is illustrated as line 202 and the modified engine torque command is illustrated as line 204 in FIGS. 3 and 4.

Next, the method 100 moves on to block 108 where it is determined if the modified engine torque command 204 is less than a threshold. The threshold may correspond to a spark retard limit during the shift. More specifically, the spark retard limit may correspond to a maximum amount of spark retard that may be obtained without causing misfire, weak combustion, or an excessive increase in the temperature of the catalytic converter. The spark retard limit may correspond to timing the spark so that the spark occurs when the pistons of the engine 14 are at approximately −3° from top dead center. It is noted that spark may be retarded at any amount up to the spark retard limit. For example, spark may be timed to occur when the pistons of the engine 14 are at top dead center, −3° from top dead center, or any incremental value between top dead center and −3° from top dead center. The threshold corresponding to the spark retard limit is illustrated as line 206 in FIGS. 3 and 4.

If the modified engine torque command 204 is less than the threshold 206 (e.g., as illustrated between times $t_2$ and $t_3$ in FIGS. 3 and 4), the method 100 moves on to block 110. At block 110, the spark of the engine is retarded at the maximum amount (i.e., at the spark retard limit) and fuel is cut off from at least one of the cylinders of the engine 14 to reduce the torque of the engine 14 from the desired torque command 202 to the modified engine torque command 204 while the hydraulic pressure of the oncoming clutch is increased. If the modified engine torque command 204 is not less than the threshold 206 (e.g., if the modified engine torque command 204 has values that are greater than or equal to the threshold 206 between times $t_2$ and $t_3$ as opposed to what is shown in FIGS. 3 and 4), the method 100 moves on to block 112. At block 112, the spark of the engine is retarded at the maximum amount or less than the maximum amount while all of the cylinders of the engine 14 remain operating to reduce the torque of the engine 14 from the desired torque command 202 to the modified engine torque command 204 while the hydraulic pressure of the oncoming clutch is increased. It is noted that the modified engine torque command 204 may have values that trace the threshold 206 or values that are greater than the threshold between times $t_2$ and $t_3$ if the answer at block 108 is NO and the torque of the engine 14 is being controlled according to block 112. After either block 110 or block 112, the method 100 moves on to block 114 where the torque of the engine 14 is increased to the desired torque command 202 once the shift has been completed (e.g., the torque of the engine 14 is ramped up according to modified engine torque command 204 to the desired torque command 202 between times $t_3$ and $t_4$ in FIGS. 3 and 4).

A target torque of the engine 14 during the shift is illustrated by line 208 in FIG. 3. The target torque 208 of the engine 14 is generated at time to once a shift in the transmission has been initiated and is set to meet the energy limits of the oncoming clutch. If the target torque 208 is less than the threshold 206, the modified engine torque command 204 is ramped down from the desired torque command 202 at time $t_1$, where the ratio change in the transmission 16 begins, to the threshold 206 at time $t_2$. The modified engine torque command 204 is then further decreased by cutting off fuel to one or more of the cylinders of the engine 14 between time $t_2$ and $t_3$. The modified engine torque command 204 is more specifically decreased by cutting off fuel to one or more of the cylinders of the engine 14 between time $t_2$ and $t_3$ to a modified target torque illustrated by line 210 in FIG. 3.

The modified target torque 210 is utilized to ensure that the correct number cylinders of the engine 14 are shut down at time $t_2$ to ensure the modified engine torque command 204 decreases to less than or equal to the target torque 208. For example, if shutting down X number of cylinders of the engine 14 will result in the modified engine torque command 204 being greater than the target torque 208 between time $t_2$ and $t_3$ and shutting down X+1 number of cylinders of the engine 14 will result in the modified engine torque command 204 being less than the target torque 208 between time $t_2$ and $t_3$ the modified target torque 210 will be structured to correspond to shutting down X+1 number of cylinders. It is also noted that the modified target torque 210 may adjusted to shut down any number of cylinders required to ensure the modified engine torque command 204 decreases to less than or equal to the target torque 208.

If the target torque 208 is greater than or equal to the threshold 206, the modified engine torque command 204 is ramped down from the desired torque command 202 at time $t_1$, where the ratio change in the transmission 16 begins, to the value of the target torque 208 that is greater than or equal to the threshold 206 at time $t_2$ and remains at the value of the target torque 208 that is greater than or equal to the threshold 206 until time $t_3$. As the oncoming clutch engages, the modified engine torque command 204 is then ramped back to the desired torque command 202 between times $t_3$ and $t_4$, regardless if the target torque 208 was less, equal to, or greater than the threshold 206.

A command to shut down one more of the cylinders of the engine 14 is illustrated by line 211 in FIG. 3. The command is off before time $t_{1.1}$, is on between times $t_{1.1}$ and $t_{2.1}$, and is off after time $t_{2.1}$ in FIG. 3. The command slightly leads times $t_2$ and $t_3$ to compensate for a delay in shutting down and turning on the one or more of the cylinders of the engine 14 at times $t_2$ and $t_3$, respectively. If the target torque 208 is not less than the threshold 206, the modified engine torque command 204 will not decrease to less than the threshold 206, all of the cylinders of the engine 14 will remain operating, and the command to shut down one more of the cylinders 211 will also remain off between times $t_{1.1}$ and $t_{2.1}$.

The commanded pressure of the oncoming clutch is illustrated by line 212 in FIG. 4. An actual or measured pressure of the oncoming clutch is illustrated by line 214 in FIG. 4. The different between the actual pressure 214 and the commanded pressure 212 are due to a delay between the command 212 and the response time of the hydraulics in the transmission 16 to adjust the pressure of the oncoming clutch. Hydraulic delays are shown in FIG. 4 during ramp down and ramp up phases of the torque of the engine 14 during the shift. The commanded pressure 212 and the actual pressure 214 are both shown to have a ramping phase 216 that occurs at or after the initiation of the ratio change at time $t_1$ and to have a boost phase 218 where the pressure is further increased to compensate for the further decrease in the torque of the engine 14 due to shutting down one or more of the cylinders between times $t_2$ and $t_3$. If the target torque 208 is greater than or equal to the threshold 206 at time $t_2$ then the boost phase 218 may be eliminated and the engine 14 will may not experience the further decrease in the torque between times $t_2$ and $t_3$ since all of the cylinders of the engine 14 will remain operating. It is noted that the corresponding times ($t_1$, $t_2$, $t_3$, $t_4$, ... $t_x$) in FIGS. 3 and 4 are meant to representative of the same times in both FIGS. 3 and 4.

An actual or measured engine torque is illustrated by line 220 in FIG. 4. The difference between the actual engine torque 220 and the modified engine torque command 204 are due to a delay between the modified engine torque command 204 and the torque reduction within the engine 14 resulting from shutting down one or more of the cylinders of the engine 14. In order to reduce or eliminate a torque disturbance in the powertrain 12, the actual pressure 214 of the oncoming clutch should be controlled to obtain a target peak pressure value of the ramping phase 216 and the actual engine torque 220 should be controlled to obtain a first target reduced value due to spark retard only at the same time or within a predetermined time tolerance. For, example, in FIG. 4 the actual pressure 214 of the oncoming clutch is shown to reach the target peak pressure value of the ramping phase 216 at time $t_2$ while the actual engine torque 220 is shown to reach the first target reduced value simultaneously at time $t_2$. As previously stated however, each of these occurrences may deviate from time $t_2$ within a predetermined time tolerance if it is sufficient to reduce or eliminate a torque disturbance in the powertrain 12. Furthermore, the target peak pressure value of the ramping phase 216 of the actual pressure 214 of the oncoming clutch and the first target reduced value of the actual engine torque 220 may be held constant for period of time before further adjustments are made.

Also, in order to further reduce or eliminate a torque disturbance in the powertrain 12, the boost phase 218 of the actual pressure 214 of the oncoming clutch and a further decrease in the actual engine torque 220 from the threshold 206 to a second target reduced value due to shutting down one or more of the cylinders of the engine 14 between times $t_2$ and $t_3$, should be timed to be within a predetermined time tolerance of each other (if spark retard is not sufficient and a further decrease in the torque of the engine 14 from the threshold 206 is necessary). For example, the initiation of the boost phase 218 of the actual pressure 214 of the oncoming clutch and the reduction in the actual engine torque 220 due to shutting down one or more of the cylinders of the engine 14 is shown to occur at time $t_{2.5}$, while the end of the boost phase 218 of the actual pressure 214 of the oncoming clutch and the increase in the actual engine torque 220 due to restarting the one or more of the cylinders of the engine 14 is shown to occur at time $t_{3.5}$. As previously stated however, each of these occurrences may deviate from time $t_{2.5}$ or $t_{3.5}$ within a predetermined time tolerance if it is sufficient to reduce or eliminate a torque disturbance in the powertrain 12.

In order to (i) ensure that the actual pressure 214 of the oncoming clutch reaches the target desired peak pressure value of the ramping phase 216 and the actual engine torque 220 reaches the first target reduced value within a predetermined time tolerance and (ii) ensure that the boost phase 218 of the actual pressure 214 of the oncoming clutch and the further decrease in the actual engine torque 220 from the threshold 206 to the second target reduced value are within a predetermined time tolerance of each other, the modified engine torque command 204 may be further adjusted by a leading command which is illustrated by line 222 in FIG. 4 to compensate for (i) the delay between the command 212 and the response time of the hydraulics in the transmission 16 to adjust the pressure of the oncoming clutch and (ii) the delay between the modified engine torque command 204 and the torque reduction resulting from shutting down one or more of the cylinders of the engine 14. The leading command 222 may more specifically be a leading torque estimate at the impeller 21.

The toque, or more specifically the torque capacity, of the oncoming clutch may be controlled via the controller 40 at either block 110 or block 112 during the shift in order to maintain continuous positive acceleration through the output of the transmission 16. The torque capacity of the oncoming clutch may be estimated based on an output torque of the transmission and other variables, and may be represented by the following equation (1):

Torque Capacity of oncoming clutch=$C1$*(desired transmission output torque)−$C2$*(impeller torque)+$C3$*(offgoing clutch capacity)−$C4$*(output shaft accel)−$C5$*(turbine shaft acceleration−engine speed accel)−$C6$*(converter tq ratio−1)*(converter fluid torque)

where C1, C2, C3, C4, C4 and C6 are constants based on the Betas and inertias for the transmission and are dependent on the start and end gears for ab upshift.

$C3$*(offgoing clutch capacity); $C5$*(turbine shaft accel−engine speed accel); and $C6$*(converter tq ratio−1)*(converter fluid torque) all typically have small values and may all be treated as equal to zero, allowing equation (1) to rewritten as equation (2):

Torque Capacity of oncoming clutch=$C1$*(desired output torque)−$C2$*(turbine torque)−$C4$*(output shaft acceleration)

The torque, or more specifically the torque capacity, of oncoming clutch may be further adjusted via the controller 40 at either block 110 or block 112 by further adjusting the pressure of the coming clutch based on feedback corresponding to an error in an input torque to the transmission 16. The error in an input torque to the transmission 16 may be represented by equation (3):

error=$x-x_{expected}$ where x=(Impeller inertia)*(engine speed accel)+(turbine inertia)*(turbine speed accel); $x\_expected$=turbine torque−one clutch capacity+$C7$*(output shaft accel); and C7 is a constant based on the Beta's and inertias for the transmission and dependent the start and end gears for the upshift. A proportional integral controller may be applied to the error term.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an engine configured to generate power;
    a transmission (i) configured to transfer power from the engine to at least one drive wheel to propel the vehicle and (ii) having a plurality of clutches configured to shift the transmission between a plurality of gear ratios;
    an accelerator pedal configured to generate a command corresponding to a desired engine torque in response to depression of the accelerator pedal; and
    a controller programmed to,
        in response to a command to shift the transmission, (i) increase a pressure of an oncoming clutch to engage the oncoming clutch and (ii) reduce a torque of the engine from the desired engine torque to a reduced value,
        in response to the reduced value exceeding a threshold, retard an engine spark and maintain operation of all cylinders of the engine to reduce the torque of the engine during the engagement of the oncoming clutch,
        in response to the reduced value being less than the threshold, retard the engine spark and shutdown at least one cylinder of the engine to reduce the torque of the engine during the engagement of the oncoming clutch, and
        in response to completing the shift of the oncoming clutch, increase the torque of the engine to the desired engine torque.

2. The vehicle of claim 1, wherein the controller is further programmed to, in response to the command to shift the transmission and the reduced value exceeding the threshold, (i) ramp up a pressure of the oncoming clutch to a desired value to engage the oncoming clutch and (ii) ramp down the torque of the engine to the reduced value during the engagement of the oncoming clutch, such that the pressure of the oncoming clutch reaches the desired value and the torque of the engine decreases to the reduced value within a predetermined time tolerance.

3. The vehicle of claim 1, wherein the controller is further programmed to, in response to the command to shift the transmission and the reduced value being less than the threshold, (i) ramp up a pressure of the oncoming clutch to a desired value and (ii) ramp down the torque of the engine to the threshold during the engagement of the oncoming clutch, such that the pressure of the oncoming clutch reaches the desired value and the torque of the engine decreases to the threshold within a predetermined time tolerance.

4. The vehicle of claim 3, wherein the controller is further programmed to, in response to the pressure of the oncoming clutch reaching the desired value and the torque of the engine decreasing to the threshold during the engagement of the oncoming clutch, decrease the torque of the engine from the threshold to the reduced value and increase the pressure of the oncoming clutch from the desired value to a boost value to increase the torque of the oncoming clutch to compensate for the decrease in the torque of the engine from the threshold to the reduced value.

5. The vehicle of claim 4, wherein the controller is further programmed to control the pressure of the oncoming clutch and the torque of the engine such that the pressure of the oncoming clutch increases to the boost value and the torque of the engine decreases to the reduced value within a second predetermined time tolerance.

6. The vehicle of claim 1, wherein (i) a torque of oncoming clutch is estimated based on an output torque of the transmission and (ii) the controller is further programmed to adjust the torque of oncoming clutch via further adjusting the pressure of the oncoming clutch based on feedback corresponding to an error in the input torque to the transmission.

7. A vehicle comprising:
an engine configured to generate power;
a transmission configured to transfer power from the engine to at least one drive wheel to propel the vehicle; and
a controller programmed to,
in response to a command to shift the transmission and a corresponding command to decrease a torque of the engine to a first value that is greater than a threshold during the shift, (i) increase a pressure of an oncoming clutch of the transmission to engage the oncoming clutch and (ii) retard an engine spark and maintain operation of all cylinders of the engine to reduce the torque of the engine during the engagement of the oncoming clutch,
in response to the command to shift the transmission and a corresponding command to decrease the torque of the engine to a second value that is less than the threshold during the shift, (i) increase the pressure of the oncoming clutch to engage the oncoming clutch and (ii) retard the engine spark and shutdown at least one cylinder of the engine to reduce the torque of the engine during the engagement of the oncoming clutch, and
in response to the command to shift the transmission and the corresponding command to decrease the torque of the engine to the first value, (i) ramp up a pressure of the oncoming clutch to a desired value and (ii) ramp down the torque of the engine to the first value during the engagement of the oncoming clutch, such that the pressure of the oncoming clutch reaches the desired value and the torque of the engine decreases to the first value within a predetermined time tolerance.

8. The vehicle of claim 7, wherein the controller is further programmed to, in response to the command to shift the transmission and the corresponding command to decrease the torque of the engine to the second value, (i) ramp up a pressure of the oncoming clutch to a desired value and (ii) ramp down the torque of the engine to the threshold during the engagement of the oncoming clutch, such that the pressure of the oncoming clutch reaches the desired value and the torque of the engine decreases to the threshold within a predetermined time tolerance.

9. The vehicle of claim 8, wherein the controller is further programmed to, in response to the oncoming clutch reaching the desired value and the torque of the engine decreasing to the threshold during the engagement of the oncoming clutch, and decrease the torque of the engine from the threshold to the second value and increase the pressure of the oncoming clutch from the desired value to a boost value to increase the torque of the oncoming clutch to compensate for the decrease in the torque of the engine from the threshold to the second value.

10. The vehicle of claim 9, wherein the controller is further programmed to control the pressure of the oncoming clutch and the torque of the engine such that the pressure of the oncoming clutch increases to the boost value and the torque of the engine decreases to the second value within a second predetermined time tolerance.

11. The vehicle of claim 7, wherein the controller is further programmed to, in response to completing the shift of the oncoming clutch, increase the torque of the engine to a desired engine torque.

12. The vehicle of claim 7, wherein (i) a torque of oncoming clutch is estimated based on an output torque of the transmission and (ii) the controller is further programmed to adjust the torque of the oncoming clutch via further adjusting the pressure of the oncoming clutch based on feedback corresponding to an error in an input torque to the transmission.

13. A vehicle comprising:
an engine configured to generate power;
a transmission configured to transfer power from the engine to at least one drive wheel to propel the vehicle; and
a controller programmed to, in response to a command to shift the transmission and a corresponding command to decrease a torque of the engine to less than a threshold corresponding to a spark retard limit during the shift, (i) increase a pressure of an oncoming clutch to engage the oncoming clutch, (ii) retard an engine spark at the spark retard limit to reduce the torque of the engine to the threshold during the engagement of the oncoming clutch, (iii) shutdown at least one cylinder of the engine to further reduce the torque of the engine to less than the threshold during the engagement of the oncoming clutch, and (iv) adjust a torque of the oncoming clutch via further adjusting the pressure of the oncoming clutch based on feedback corresponding to an error in an input torque to the transmission, wherein the torque of oncoming clutch is estimated based on an output torque of the transmission.

14. The vehicle of claim 13, wherein the controller is further programmed to, in response to the command to shift the transmission and a corresponding command to decrease the torque of the engine to greater than the threshold during the shift, (i) increase the pressure of the oncoming clutch of the transmission to engage the oncoming clutch and (ii) retard the engine spark at less than or equal to the spark retard limit and maintain operation of all cylinders of the engine to reduce the torque of the engine during the engagement of the oncoming clutch.

* * * * *